US008646032B2

(12) United States Patent
Aad et al.

(10) Patent No.: US 8,646,032 B2
(45) Date of Patent: Feb. 4, 2014

(54) METHOD AND APPARATUS PROVIDING PRIVACY SETTING AND MONITORING USER INTERFACE

(75) Inventors: Imad Aad, Preverenges (CH);
Debmalya Biswas, Lausanne (CH);
Gian Paolo Perrucci, Lausanne (CH);
Julien Eberle, Cugy (CH)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 13/341,290

(22) Filed: Dec. 30, 2011

(65) Prior Publication Data

US 2013/0174211 A1 Jul. 4, 2013

(51) Int. Cl.
*H04L 29/06* (2006.01)

(52) U.S. Cl.
USPC ............... 726/1; 713/165; 713/167; 713/193; 709/223; 709/224; 709/225

(58) Field of Classification Search
USPC ........ 726/1; 713/193, 165, 167; 709/223–225
See application file for complete search history.

(56) References Cited

U.S. PATENT DOCUMENTS

| 7,478,157 B2* | 1/2009 | Bohrer et al. ................. 709/226 |
| 7,487,363 B2 | 2/2009 | Alve et al. ...................... 713/193 |
| 2002/0173295 A1 | 11/2002 | Nykanen et al. .............. 455/414 |
| 2004/0176104 A1 | 9/2004 | Arcens ........................ 455/456.3 |
| 2006/0259950 A1* | 11/2006 | Mattsson ......................... 726/1 |
| 2007/0143824 A1* | 6/2007 | Shahbazi .......................... 726/1 |
| 2008/0196083 A1* | 8/2008 | Parks et al. ....................... 726/1 |
| 2008/0215509 A1* | 9/2008 | Charlton ......................... 706/11 |
| 2009/0025057 A1* | 1/2009 | Mattsson .......................... 726/1 |
| 2009/0300716 A1* | 12/2009 | Ahn .................................. 726/1 |
| 2009/0307743 A1* | 12/2009 | Azagury et al. .................. 726/1 |
| 2009/0328135 A1 | 12/2009 | Szabo et al. ....................... 726/1 |
| 2010/0077484 A1 | 3/2010 | Paretti et al. ..................... 726/26 |
| 2010/0257577 A1 | 10/2010 | Grandison et al. ................ 726/1 |
| 2011/0030067 A1 | 2/2011 | Wilson ............................ 726/27 |
| 2011/0225200 A1* | 9/2011 | Danis et al. .................... 707/783 |
| 2011/0307600 A1* | 12/2011 | Polley et al. .................. 709/224 |

FOREIGN PATENT DOCUMENTS

WO WO-2010/103177 A 9/2010
WO WO-2010/103177 A1 9/2010

OTHER PUBLICATIONS

"Windows Phone 7 Guides for IT Professionals", http://www.microsoft.com/download/en/details.aspx?displaylang—en &id=8842; Dec. 21, 2011, 2 pgs.
"A Window Into Mobile Device Security", Carey Nachenberg, Symantec™, 2011, 23 pgs.

(Continued)

*Primary Examiner* — Kambiz Zand
*Assistant Examiner* — Tongoc Tran
(74) *Attorney, Agent, or Firm* — Harrington & Smith

(57) ABSTRACT

A method and an apparatus provide for operating a user interface of a device to receive from a user, for individual ones of a plurality of user privacy categories, a user privacy setting; to map each user privacy setting to one or more device sensors to form a sensor policy for the user privacy category; and to monitor application program accesses to device sensors to detect a violation of a sensor policy. An aspect of the exemplary embodiments of this invention is the user interface that can represent privacy levels of each application program to the user in a "user-friendly" format. Another aspect of the exemplary embodiments is to provide the user device with an ability to detect and act on or at least report privacy violations by the application programs.

26 Claims, 10 Drawing Sheets

(56) References Cited

OTHER PUBLICATIONS

"Windows Phone 7 Guides for IT Professionals", http://www.microsoft.com/download/en/details.aspx?displaylang=en&id=8842; Dec. 21, 2011, 2 pgs.

"TaintDroid: An Information-Flow Tracking System for Realtime Privacy Monitoring on Smartphones", William Enck et al., In proceedings of the 9th USENIX Symposium on Operating Systems Design and Implementation (OSDI), 2010, 15 pgs.

"Automating Privacy Testing of Smartphone Applications", Peter Gilbert et al., 5 pgs.

"Some Android apps caught covertly sending GPS data to advertisers", Ryan Paul, Dec. 21, 2011, 2 pgs.

"Study Shows Some Android Apps Leak User Data Without Clear Notifications", Priva Ganapati, Gadget Lab, Sep. 30, 2010, 3 pgs.

"Your Apps Are Watching You", Scott Thurm et al., The Wall Street Journal, Dec. 21, 2011, 5 pgs.

"PiOS: Detecting Privacy Leaks in iOS Applications", Manuel Egele et al., 2011, 15 pgs.

LBE Privacy Guard For Android Monitors Access Requests, Guards Privacy:, Sameed, May 28, 2011, 4 pgs.

"Protect Your Most Personal Device", 1022 Mobile Threat Report, Lookout Mobile Security, Dec. 21, 2011, 3 pgs.

\* cited by examiner

| | | GPS | WiFi (MAC) | BT | CELL ID | CALL LOGS | SMS | AUDIO | ACCELEROMETER | ADDRESS BOOK | CALENDAR | PICTURE | MUSIC | IMEI | IMSI | DEVICE PROFILE | RING TYPE | BATTERY LEVEL | CHARGING INDICATOR | ... |
|---|---|---|---|---|---|---|---|---|---|---|---|---|---|---|---|---|---|---|---|---|
| FINANCIAL | ... | | | | | | | | | | | | | | | | | | | |
| | FISCAL FRAUD | | | | | x | x | x | | x | | | | | | | | | | |
| | INVESTMENT | x | | | | x | x | x | | x | | | | | | | | | | |
| | FORTUNE | x | | | | x | x | x | | x | | | | | | | | | | |
| MEDICAL | ... | | | | | | | | | | | | | | | | | | | |
| | VACCINATIONS | | x | | | | x | x | | | | | | | | | | | | |
| | DISEASES | x | x | | x | x | x | x | | x | | | | | | | | | | |
| | EXPECTED LIFETIME | x | x | | | | x | x | | | | | | | | | | | | |
| LOCATION | ... | | | | | | | | | | | | | | | | | | | |
| | ENTERTAINMENT | x | x | x | x | | | x | x | | | | | | | | | | | |
| | WORK | x | x | x | x | | | | | | | | | | | | | | | |
| | HOME | x | x | x | x | | | | | | | | | | | | | | | |
| | LOCATION ITSELF | x | x | x | x | | | | | | | | | | | | | | | |
| SOCIAL CONNECTIONS | ... | | | | | | | | | | | | | | | | | | | |
| | FREQ. OF INTERACTIONS | x | x | | x | x | x | x | | x | x | | | | | | | | | |
| | TYPE OF CONNECTION | | x | | | x | x | x | | x | x | | | | | | | | | |
| | # OF CONNECTIONS | x | x | | x | x | x | x | | x | x | | | | | | | | | |
| | WITH WHOM | x | x | | x | x | x | x | | x | x | | | | | | | | | |
| CONTEXT | ... | | | | | | | | | | | | | | | | | | | |
| | MOOD | | | | | | x | x | | x | | ... | | | | | | | | |
| | ACTIVITY | x | x | x | x | | | x | x | | x | | | | | | | | | |
| | TRANSPORTATION MEANS | x | x | x | x | | | x | x | | x | | | | | | | | | |
| PROFESSIONAL | ... | | | | | | | | | | | | | | | | | | | |
| | COLLABORATIONS | x | x | x | x | x | x | x | | x | x | | | | | | | | | |
| | PROFESSION | x | x | x | x | x | x | x | | x | x | | | | | | | | | |
| PERSONAL | ... | | | | | | | | | | | | | | | | | | | |
| | ETHNICITY | x | x | x | x | x | x | x | | x | | | | | | | | | | |
| | SEXUAL PREFERENCE | x | x | x | x | x | x | x | | x | | | | | | | | | | |
| | MARITAL STATUS | | x | x | | x | x | x | | x | x | | | | | | | | | |
| | RELIGION | x | x | x | x | x | x | x | | x | x | | | | | | | | | |
| | AGE | | x | | | x | x | x | | x | | | | | | | | | | |
| | GENDER | | x | x | | x | x | x | | x | | | | | | | | | | |

FIG. 4

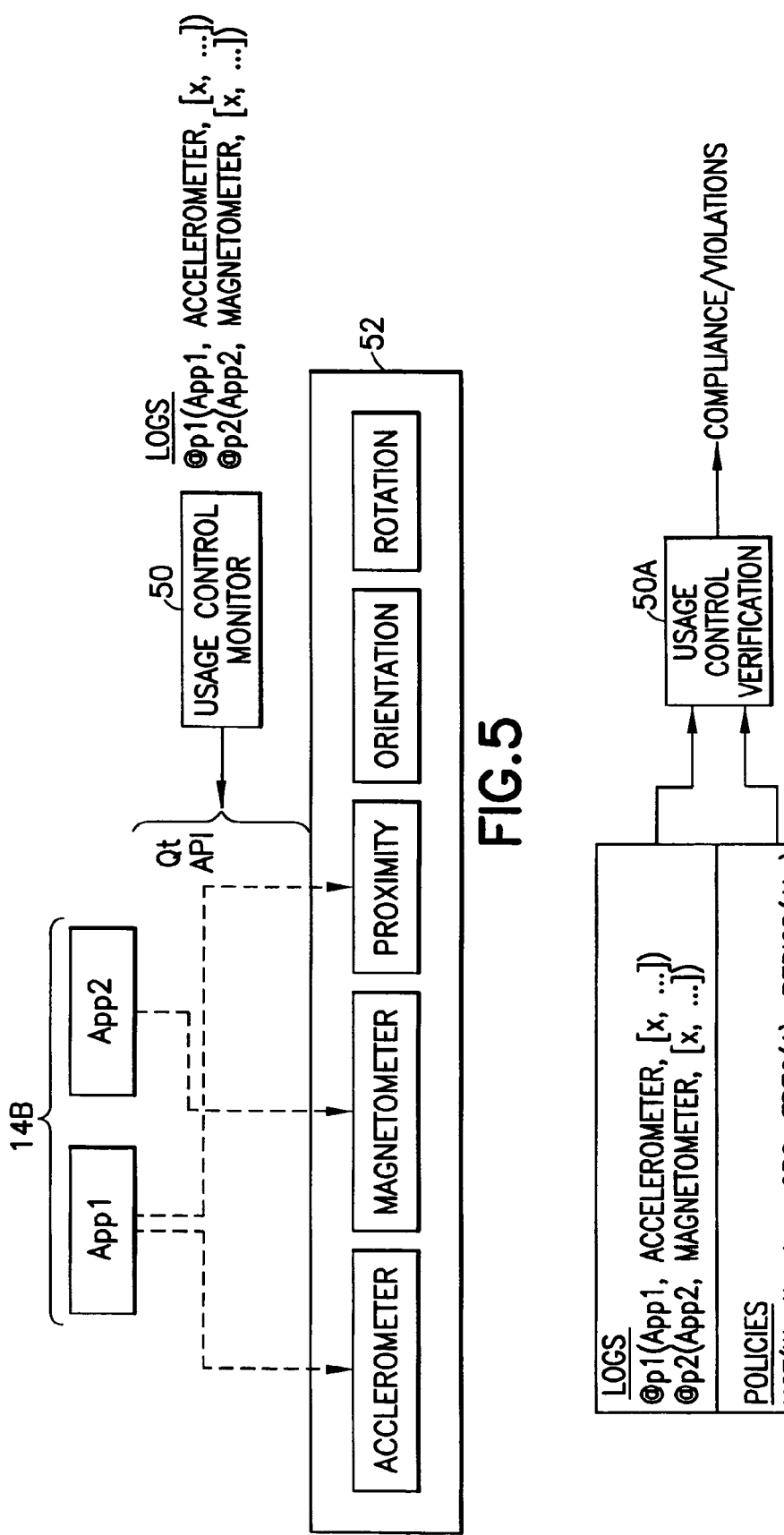

METHOD AND APPARATUS PROVIDING PRIVACY SETTING AND MONITORING USER INTERFACE

TECHNICAL FIELD

The exemplary and non-limiting embodiments of this invention relate generally to user devices, methods and computer programs and, more specifically, relate to the control of a user's personal data that is resident on a user's device.

BACKGROUND

Modern user devices such as phones (e.g., smartphones), tablets, notebooks, electronic readers and the like typically include, in addition to wireless communication capabilities, one or more sensors that can detect and/or infer the context of the device and, by extension, contextual information of the user. One example is the use of a position or location determining sensor such as one embodied as a global positioning satellite (GPS) receiver and sub-system.

In addition to the large amount of personal data stored on these user devices (sms logs, call logs, contacts list, etc.) many sensors can be used to infer the location, context, personal habits, etc. of the user. All of this information is exposed to at least two privacy threats: (A) third party applications that the user installs, but does not necessarily trust; and (B) the possibility that this information will be shared or published by the user himself, unaware of the privacy threats.

One problem that arises relates to the control of the user information to provide the user with a desired degree of privacy.

SUMMARY

The foregoing and other problems are overcome, and other advantages are realized, in accordance with the exemplary embodiments of this invention.

In a first aspect thereof the exemplary embodiments of this invention provide a method that comprises operating a user interface of a device to receive from a user, for individual ones of a plurality of user privacy categories, a user privacy setting; mapping each user privacy setting to one or more device sensors to form a sensor policy for the user privacy category; and monitoring application program accesses to device sensors to detect a violation of a sensor policy.

In another aspect thereof the exemplary embodiments of this invention provide an apparatus that comprises a processor and a memory that includes computer program code. The memory and computer program code are configured to, with the processor, cause the apparatus at least to operate a user interface of the apparatus to receive from a user, for individual ones of a plurality of user privacy categories, a user privacy setting; to map each user privacy setting to one or more sensors of the apparatus to form a sensor policy for the user privacy category; and to monitor application program accesses to the sensors to detect a violation of a sensor policy.

In yet another aspect thereof the exemplary embodiments of this invention provide a non-transitory computer readable data storage medium that stores a data structure, the data structure comprising a matrix having columns each comprised of a user's personal information expressed as privacy categories and sub-categories, and rows each comprised of a sensor of a user device in which the non-transitory computer readable data storage medium is installed during use.

BRIEF DESCRIPTION OF THE DRAWINGS

The foregoing and other aspects of the exemplary embodiments of this invention are made more evident in the following Detailed Description, when read in conjunction with the attached Drawing Figures, wherein:

FIG. 4 shows an exemplary and non-limiting sample mapping between sensor data and personal information.

FIG. 5 shows an example of real-time interception of sensor usage by a usage control monitor function shown in FIG. 2.

FIG. 6 shows an example of offline (non-real-time) privacy compliance verification.

DETAILED DESCRIPTION

Figure 1:
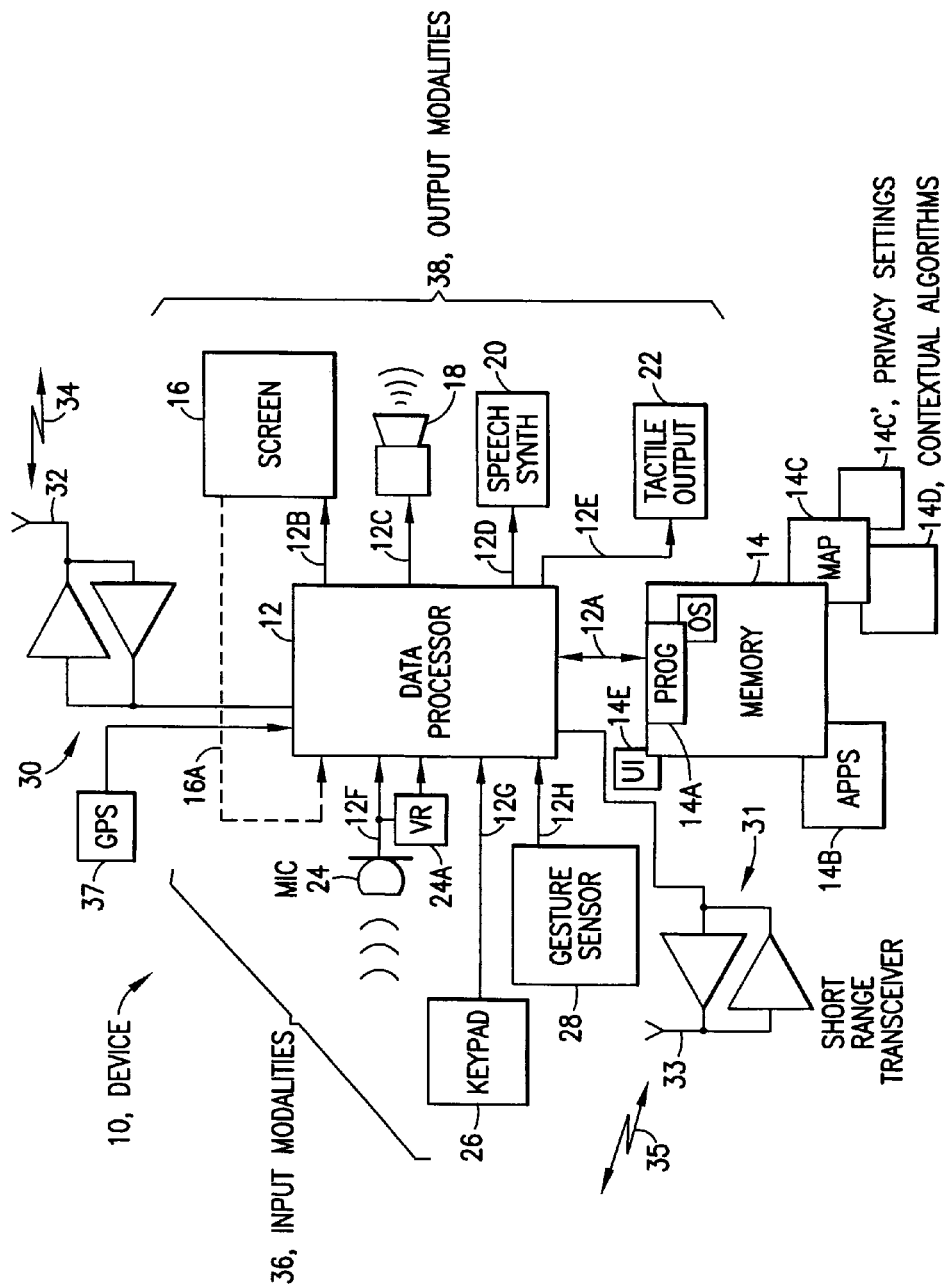
FIG. 1 is a block diagram of a device that is suitable for practicing the embodiments of this invention.

As was mentioned above, with smartphones and other user devices becoming ubiquitous, the sensors present in these devices can be used to infer very personal real-time contextual information about the user, e.g., location, activities, habits (habitual behaviors). Having access to this wealth of information about the user allows service providers to provide highly context sensitive services to the user. However, many users are reluctant to share this information with service providers due to the considerable privacy implications if this data is compromised and misused. What are clearly needed are controls/tools that allow a user to effectively protect his privacy, while still enjoying the benefits of context-enabled services.

The user can be enabled to specify privacy settings. However, the typical user will not have knowledge of the underlying technical details of his device (e.g., smartphone) and hence is unable to specify the desired privacy settings at the sensor level.

In this discussion "sensors" are assumed to also refer to various input devices available in the phone (e.g., a microphone, a camera), and a file system of the phone that in general allows access to user-generated content (e.g., pictures). Ideally, the user should be able to specify a privacy setting of the form (as one non-limiting example):

"Do not allow the Weather application (app) to access my GPS more than once per hour".

This being said, the average user typically only broadly understands the location aspect, and is unaware of the different sensors (GPS, Wi-Fi) and algorithms, e.g., Wi-Fi triangulation, that can be used to derive the location information. This results in a need for user-friendly privacy controls that allow the user to specify privacy settings at a granularity that the user is comfortable with. However, implementing such a user-friendly privacy control in turn results in a number the challenges.

For example, the high level user privacy settings (e.g., location) need to be mapped to the low-level sensor(s) (e.g. GPS, WiFi) access patterns.

Further by example, mappings can be used to monitor the usage of relevant sensors in the phone, and to intercept if necessary accesses to the sensors by the application programs (referred to hereafter simply as 'apps').

Also be example, it is desirable to analyze the usage and present the usage summary to the user. Analogous to capturing the privacy settings in a user-friendly fashion, the usage summary report should be presented to the user in a user readable language. This implies the use of a reverse mapping from the low level sensor usage details to the user level contextual parameters.

As one further and non-limiting example, it is desirable to enforce the user privacy settings by taking proactive actions (e.g., prevent apps from accessing sensors in violation of a user privacy setting) or reactive actions (e.g., present information to the user regarding any privacy violation by an app).

Many mobile device operating system (OS) platforms currently rely on an "install-time" capabilities based model to protect user privacy, where access to a sensor is only given to an app after explicit authorization by the user during app installation. At a high level this model works as follows. Apps declare a list of sensors to which they need access (to provide their functionality) in an XML-based Manifest file. During installation, the Manifest file is read and a list of required sensor(s) access is presented to the user. The app is allowed to be installed only if the user agrees (enters a "Yes"). After installation, the mobile OS provides the needed access control to ensure that the app is only allowed access to those sensors declared in the app's Manifest file.

While this type of procedure acts as a deterrent it can be shown that such a model is inherently unreliable. For example one app certification model is more coarse grained, where apps go through a validation check that is intended to preserve user-privacy before deployment, but without involving the user. Once certified, the apps have unlimited access to most sensors of the phone.

Various apps are available that are intended to inform the user about his privacy and to give the user control over his privacy. One such app gives the user detailed control of the accesses to private data, sorted by application or by sensor. However, and as was noted above, the typical user is unlikely to understand the magnitude of the threats when simply presented with the identification of a sensor being accessed by an intrusive application.

It is clearly much more relevant: to inform the user that "This application is trying to access data that can be used to identify your current activity", then to enable the user to say "hide my personal information whenever I am at work", rather than to have the user need to specify "disable accesses to my GPS, WiFi, SMS, Bluetooth, etc., whenever I happen to be within coordinates [x1,y1] and [x2,y2], or hearing WiFi 'abc', Bluetooth 'def' . . . ."

The exemplary embodiments of this invention in one aspect thereof provide a user-friendly privacy control for a user of a device, such as a phone (e.g., a smartphone). The exemplary embodiments provide user privacy settings in a user readable contextual language, enable monitoring to intercept the usage of relevant phone sensors and also provide a feedback mechanism to present sensor usage information to the user, again in the high level user readable language. The exemplary embodiments also enable the enforcement of the user privacy settings in real time (e.g., by blocking unauthorized sensor accesses) or in a delayed fashion (e.g., by reporting privacy violations by specific apps to the user).

For the purposes of describing the embodiments of this invention a 'smartphone' can be considered as a user communication device having a user interface, at least one wireless communication modality and sufficient memory capacity and data processing capability for storing and executing application programs in cooperation with an operating system.

An aspect of these embodiments is a map that converts high level user privacy settings to low level sensor access patterns, and vice versa. The mapping depends at least in part on contextual algorithms that take sensor data as input and output contextual information about the user. The contextual algorithms have the capability to evolve over time. The exemplary embodiments thus also enable the updating of the relevant contextual algorithms over time thereby protecting the user against newly evolving privacy threats.

Before describing the exemplary embodiments of this invention in further detail reference is made to FIG. 1 for illustrating a simplified block diagram of an exemplary embodiment of an electronic device 10 that is suitable for use in practicing the exemplary embodiments of this invention. In FIG. 1 device 10 includes a data processor 12 that is coupled through a bus 12A with a memory 14 that stores a program (PROG) 14A of instructions that are executable by the data processor 12. The program 14A can include an operating system (OS) and other programs needed to operate the device 10. The device 10 may further include a plurality of input and output devices and subsystems, referred to herein also as input modalities 36 and output modalities 38. As exemplary output devices there may one or more of a visual display screen 16, such as an LCD or a plasma display screen, an acoustic output transducer such as a loudspeaker 18, a speech synthesis subsystem 20 having an output that can be played through the loudspeaker 18 (or through another acoustic output transducer), and a tactile output device or transducer 22, such as a vibratory device (e.g., a piezoelectric transducer). These output devices are coupled to corresponding output paths 12B, 12C, 12D and 12E from the data processor 12. As exemplary input devices there may one or more of an acoustic input transducer such as a microphone 24, an associated speech or voice recognition function (VR) 24A, a keypad or keyboard 26 and a gesture sensor 28, such as a device that is responsive to a rotation about at least one axis and/or to a force applied by a user's finger or stylus, such as when making a tapping gesture. These input devices are coupled to corresponding input paths 12F, 12G and 12H to the data processor 12. If the screen 16 is a touch-sensitive screen then there may also be an input 16A from the screen 16 to the data processor 12. In this case the input to the data processor 12 may represent activation of a virtual key or button by the user, as opposed to the use of the keypad/keyboard 26 where the input signal may represent activation of a physical key or button (such as an alphanumeric key or a physical 'soft' key or button). The microphone 24 may be coupled with the speech recognition functionality of the device 10 (the VR 24A) whereby a word or words spoken by the user can be interpreted by the data processor 12 as representing a command.

It should be appreciated that the data processor block 12 may actually comprise a number of circuit types, in addition to a data processor per se, such as analog-to-digital converters and digital-to-analog converters that support the operation of the various input modalities 36 and output modalities 38.

Some type of location determination sub-system can be provided, such as a GPS receiver 37.

It should be appreciated that at least some of the input modalities 36 can be considered as being sensors of the device 10 such as, as non-limiting examples, the microphone 24, the gesture sensor 28 and the GPS sub-system 37. Other examples of sensors that can be provided are described below. That is, the depiction of the device 10 shown in FIG. 1 is exemplary, as the sensors and sensor-related functions (e.g., device-related information that could be accessed or interrogated by an application program (app) 14B), can include, as non-limiting examples, any or all of those shown in FIG. 4 (e.g., GPS, WiFi, BT, Cell ID, Call logs, SMS (short message service), Audio, Accelerometer, Address book (contact information), Calendar, Picture, Music, IMEI (International Mobile Equipment Identity), IMSI (International Mobile Subscriber Identity), Device profile, Ring type, Battery (charge) level and Charging indicator.) Any one of these various functional units and user or device related information can be referred to below simply as a "sensor".

In the exemplary embodiments the device 10 has user communication capabilities and includes a suitable transceiver 30, such as a radio frequency transceiver coupled with at least one antenna 32 for conducting wireless communications through a bidirectional long range radio frequency link 34 (e.g., a link to a cellular communication network). The cellular communication network can be compliant with any type of cellular communication network including, for example, GSM, LIE, LTE-A, and so forth. That is, the use of this invention is not contingent on the use of any particular type of cellular network. The device 10 can also include a second transceiver 31 coupled with at least one antenna 33 to a short range radio frequency link 35, such as a low power radio frequency link that may be a Bluetooth™ (BT) link or a WiFi link. In other embodiments the transceiver 31 may be optically based and may then include suitable optical source and detector components, such as an infrared emitter and an infrared detector.

It should be noted that the various input modalities 36 and output modalities 38 are exemplary, and not all may be present in a given implementation. For example, the exemplary embodiments of this invention may be used with just the display screen 16 and the keypad/keyboard 26, or with just the display screen 16 if the screen is touch sensitive to permit the user to enter information and commands. In some embodiments of this invention the user interface could be based solely on the use of voice recognition and voice synthesis, and no touch sensitive display screen may be needed at all.

The program 14A is assumed to include program instructions that, when executed by the data processor 12, enable the electronic device 10 to operate in accordance with the exemplary embodiments of this invention as will be discussed below in greater detail. The program 14A can include the OS and any associated file system utilities depending on the implementation of the software architecture of the device 10.

In general, the various embodiments of the device 10 can include, but are not limited to, phones, smartphones, personal digital assistants (PDAs) possibly having wireless communication capabilities, portable computers possibly having wireless communication capabilities, GPS devices possibly having wireless communication capabilities, image capture devices such as digital cameras possibly having wireless communication capabilities, gaming devices possibly having wireless communication capabilities, music storage and playback appliances possibly having wireless communication capabilities, Internet appliances permitting wireless or wired Internet access and browsing, as well as portable units or terminals that incorporate combinations of such functions.

The exemplary embodiments of this invention can be implemented by computer software executable by the data processor 12, or by hardware, or by a combination of software and hardware (and firmware).

The memory 14 may be of any type suitable to the local technical environment and may be implemented using any suitable data storage technology, such as semiconductor-based memory devices, flash memory, magnetic memory devices and systems, optical memory devices and systems, fixed memory and removable memory. The data processor 12 may be of any type suitable to the local technical environment, and may include one or more of general purpose computers, special purpose computers, microprocessors, digital signal processors (DSPs) and processors based on multi-core processor architectures, as non-limiting examples.

The memory 14 is shown as including computer program code that implements the various apps (application programs) 14B that can be pre-installed in the device 10 or subsequently installed by the user, such as by being downloaded via one of the radio frequency links 34 or 35. The above-mentioned map that converts high level user privacy settings to low level sensor access patterns can be stored as part of the MAP 14C in the memory 14. The MAP 14C can also include a data structure along the lines of the one depicted in FIG. 4 and described below, in addition to various software modules that operate to populate the data structure based on user input (e.g., see FIGS. 3A, 3B) and interpret the data structure in light of sensor usage or attempted sensor usage by the apps 14B. Associated with the MAP 14C can be stored user privacy settings 14C', or these privacy settings can be assumed to be implicit in the data structure shown in FIG. 4. The memory 14 can also store the above mention contextual algorithms as Contextual Algorithms 14D. The memory 14 also stores computer software that implements a privacy user interface (UI) 14E that operates in conjunction with the input modalities 36 and the output modalities 38. Aspects of the privacy UI 14E are described in detail below.

The Contextual Algorithms 14D can be considered to encompass those algorithms that are used to determine user context based on (possibly low level) sensor readings of the user's device 10. For example, and in a simple case, one Contextual Algorithm 14D can be one that determines user activity (e.g., if the user is walking, running, sitting in a moving vehicle, gesturing with his hands, etc.) based on accelerometer readings. The exemplary embodiments of this invention intercept such low level sensor readings and then use the Contextual Algorithms 14D to determine the context information that can be inferred about the user. Note in this regard that the more personal information that can be inferred, the greater is the user's privacy risk.

Figure 2:
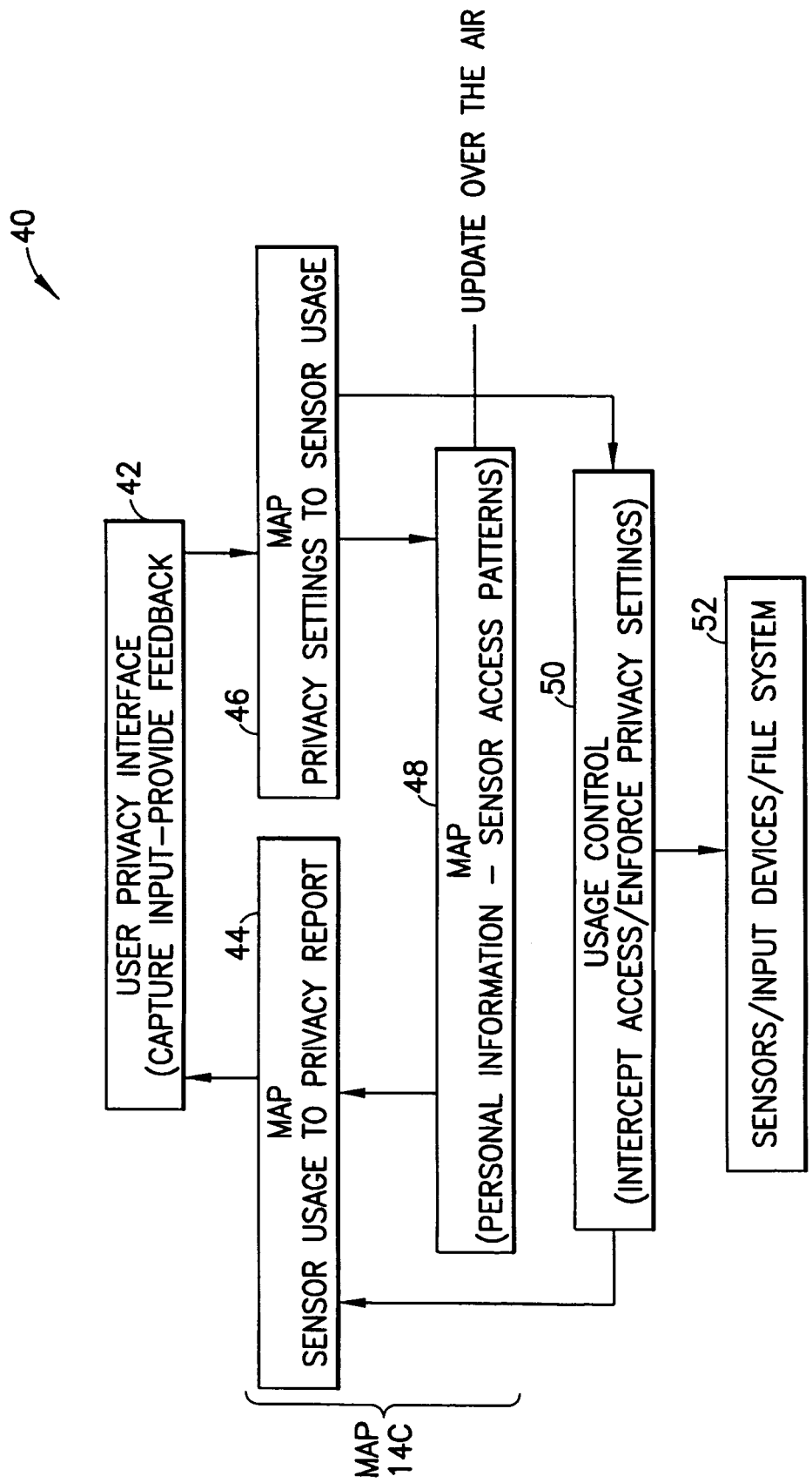
FIG. 2 presents an overview of a user privacy control architecture that can be based on the device shown in FIG. 1.

FIG. 2 presents an overview of a user privacy control architecture 40 that can be based on the device 10 shown in FIG. 1. The user privacy control architecture 40 is a feature of the exemplary embodiments of this invention and is described in detail below.

The user privacy control architecture 40 includes a number of interacting functional units or modules. One of these functional units or modules is a user privacy interface 42 that captures user input and provides user feedback. The user privacy interface 42 can be considered as an aspect of the privacy UI 14E. Also shown is the MAP 14C that can be sub-divided into a MAP 44 that converts sensor usage to a privacy report, a MAP 46 that converts the user privacy settings 14C' to sensor usage and a MAP 48 responsible for user personal information and sensor access patterns. An update of this module can be performed over the air (OTA). Another functional unit or module of the architecture 40 is a usage control module 50 responsible for intercepting accesses and enforcing the user privacy settings 14C'. The module 52 represents the various sensors, the input devices (input modalities 36), and a file system associated with the OS.

Figure 3A:
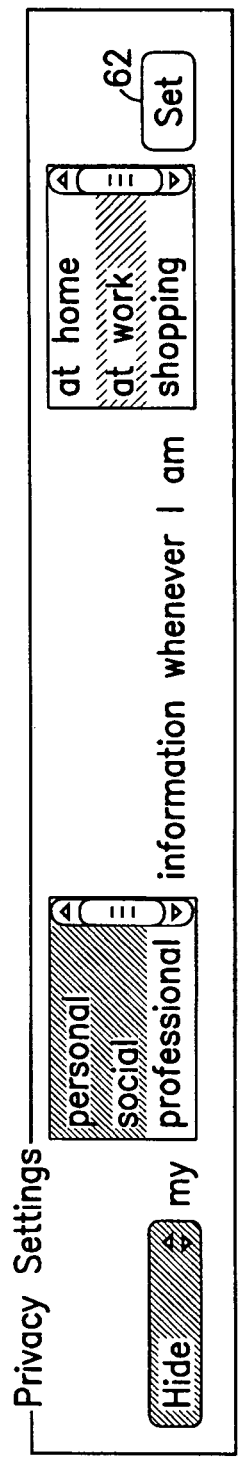
FIG. 3A shows a non-limiting example of a user-friendly privacy control input that is used to construct a table or database of user privacy settings stored in the memory shown in FIG. 1.

An aspect of this invention is a user-friendly privacy control input 60 shown in FIG. 3A as one non-limiting and exemplary implementation. The user-friendly privacy control input 60 is an element of the privacy UI 14E and thus of the user privacy interface module 42 of FIG. 2. The control input 60 can be presented to the user by being displayed on the screen 16 and represents a preliminary operation of capturing the user privacy settings for storage in the privacy settings 14C'. The control input 60 presents a user-friendly language such as the one illustrated. For example, the user can be presented with the control input 60 that allows the user to 'hide' (or 'expose') his or her 'personal', 'social', 'professional' (etc., user selectable) information whenever the user is 'home', 'at work', shopping' (etc., user selectable). By activating a Set button 62 the constructed privacy setting is stored in the privacy settings 14C' for use by the MAP 14C. Multiple presentations and uses of the control input 60 can populate the privacy settings 14C' with a number of different privacy settings for different classes of user information in different user contexts.

Figure 3B:
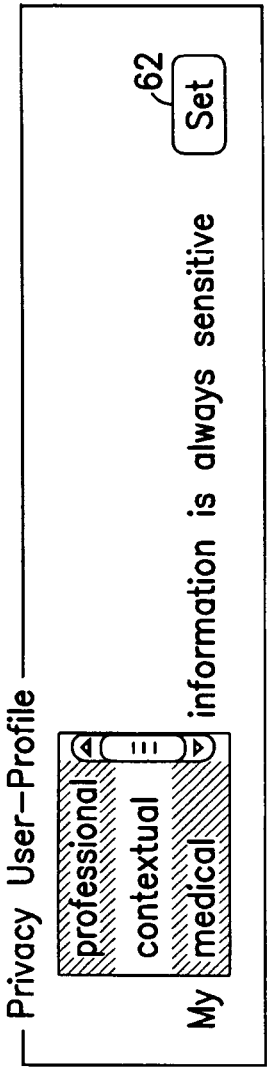
FIG. 3B shows another non-limiting example of a user-friendly privacy control input.

The embodiment of FIG. 3B provides the user with a user interface that allows the user to set pre-defined user profiles (e.g., 'professional', 'contextual', 'medical') to control access to the sensors of the device 10. In this case activating the Set button 62 would indicate that, e.g., the profile 'medical' is always sensitive and, thus, could be used to restrict all sensor accesses for this profile.

Further aspects of the user interface 14E are described in detail below.

FIG. 4 shows an exemplary and non-limiting sample mapping between sensor data and personal information. More specifically, FIG. 4 shows an example of a matrix that maps what user personal information (e.g., Personal, Professional, Context, Social Connections, Location, Medical, Financial, etc.) can be inferred based on which sensors, information sources and input devices (e.g., input modalities 36) of the of the device 10. Note that each personal information privacy category can include several sub-categories. For example, the Context personal information category could include as sub-categories: Transportation means, Activity and Mood. An exemplary list of sensors, data sources and input modalities includes, but is not limited to: GPS, WiFi, BT, Cell ID, Call logs, SMS, Audio, Accelerometer, Address book, Calendar, Picture, Music, IMEI, IMSI, Device profile, Ring type, Battery (charge) level and Charging indicator. For the purposes of describing this invention all of these may be referred to generically as 'sensors'.

Data from various sensors can be combined to infer personal information, using algorithms that can be simple (e.g., instant location) to more complicated. As such, the 'X' in the table of FIG. 4 can refer to a simple dependency on a specific sensor S, or to more complex access patterns, e.g., "Sensors S1 and S2 need to be accessed with frequencies f1 and f2 within time periods t1 and t2 to infer context information C".

The MAP 46 that converts the user privacy settings 14C' to sensor usage of FIG. 2 is the component is responsible for mapping high level user privacy settings, e.g.:

'Protect my professional information whenever I am at work' to the sensor level policy:

'context(location, office)—DENY (S1, freq(n1), time_period(t1)) AND DENY (S2, freq(n2), time_period(t2)) AND . . . .'

This example assumes that inferring user professional information requires accessing sensors S1, S2, . . . with frequency n1, n2, . . . within time periods t1, t2, . . . , based on the mapping depicted in FIG. 4.

It can be noted that monitoring sensor usage will typically have some performance overhead and, ideally, only "relevant" sensors are monitored, i.e., only those sensors which are required to detect violations with respect to the set privacy policies. As an example, and with respect to the privacy policy (privacy setting) above, it is sufficient to intercept accesses to sensor S1 only during the time period t1.

Discussed now is usage control with respect to monitoring, verification and enforcement.

Once the user privacy settings 14C' have been mapped to sensor-level policies, the usage control module 50 is responsible for monitoring sensor usage in compliance with the sensor-level policies. There are different possibilities with respect to 'when' and 'where' to monitor sensors usage, and also with respect to 'what' to do when a violation is detected.

Sensor usage data could be intercepted, for example, at the OS level. At the OS level this implies intercepting sensor access via their corresponding device drivers.

Sensor usage data could be intercepted, for example, at the Platform level. Platform level interception refers to, for example, integrating interception with middleware sensor frameworks such as one known as Qt (QT is a registered trademark of Nokia Corporation)-Mobility (available from Nokia Corporation). In this case usage of a sensor is monitored when the sensor is accessed via a corresponding QT Sensor API (application program interface).

FIG. 5 describes a scenario where access to sensors 52 supported by the Qt-Mobility 1.1.3 (Accelerometer, Ambient Light, Compass, Magnetometer, Orientation, Proximity, Rotation) are intercepted by the usage control monitor 50 and logged as, e.g.:

'App1 accessed the sensor reading R1 of sensor S1 at time-point p1'

@p1(App1, R1, S1, p1).

Sensor usage data also could be intercepted, for example, at the Application level. This implies that sensor monitoring or usage logging code can be integrated within the application code itself.

Sensor usage data could also be intercepted, for example, at the Network level. In this case interception occurs when sensor data is being uploaded over the network.

These different interception scenarios have various trade-offs with respect to the integration required with the underlying platform, the scope of interception (e.g., network level interception would generally not be applicable if the data is encrypted by the application before transmitting the data over the network, and also if the application performs some in-device processing on the data before sharing it over the network.)

Along the same line, sensor usage can be processed both in real-time and/or in a delayed (offline) fashion. Real-time processing involves checking compliance for each sensor access (before actually allowing access to the sensor data). Offline processing corresponds to logging sensor usage in real-time and analyzing the usage logs for the occurrence of violations at a later point in time (off-line).

FIG. 6 illustrates an example of an offline verification (compliance assessment) mechanism. In this case the logs (e.g., one recording access to the accelerometer by APP1 and another recording access to the magnetometer by APP2) are processed in conjunction with a privacy policy by a usage control verification sub-module 50A of the usage control module 50. More specifically, logs:

@p1(App1, Accelerometer, [x, . . . ])
@p2(App2, Magnetometer, [x, . . . ])

are processed in conjunction with a policy such as:
NOT(WeatherApp, GPS, freq(1), period(1 hr)).

Based on the analysis performed the usage control verification sub-module 50A reports one of compliance or a violation by APP1 and APP2 with respect to their sensor accesses.

Different types of actions can be taken when a violation is detected by the usage control monitor 50 or the usage control verification module 50A.

For example, a pre-emptive approach restricts access in real-time if a violation is detected. This approach relies on the use of real-time interception of sensor accesses and the ability to act before sensor data is actually read by the application 14B.

Further by example, a reactive approach can function in a manner analogous to an information tool that provides detailed sensor usage information to the user along with possible privacy implications. Discussed below is a procedure to map sensor usage back to privacy implications for the user (which can then be displayed to the user).

Described now is the operation of the map sensor usage to privacy report module 44 shown in FIG. 2.

As was noted above, one possible use-case for the intercepted sensor data is to present it to the user in a summarized fashion. The presented information can also include details of any privacy violations by the apps 14B. In order to provide this privacy-related feedback to the user the tool can assume the role of a powerful attacker who, by analyzing the actual sensor usage data, uses the (up-to-date) mapping in FIG. 4 to compute the personal/professional/contextual, etc., information of the user that could be inferred from the actual sensor usage data. The sensor usage details, possibly including a privacy threat perception, is then presented to the user such as by displaying it on the screen 16. The user can apply this information, for example, as an input to adapt the user's privacy settings in response to the reported behavior of the apps 14B, e.g., by relaxing or restricting certain usage policies with respect to certain ones of the apps 14B.

Another use-case is to display real-time sensor usage information to the user in a manner analogous to a system monitor utility found in many computer systems. This type of display could be offered as a user-selectable alternative to the summarized fashion of the intercepted sensor data as described above.

One clear and distinct advantage and technical effect of the use of these embodiments of this invention is that they provide enhanced privacy control feedback to the user, in a user-readable and understandable manner.

Described now in further detail are various aspects of the user interface (UI) 14E (and the user privacy interface 42 shown in FIG. 2) enabling the privacy settings to be entered and displayed to the user.

A further aspect of this invention is to provide an ability to visualize for the user the user's privacy settings based on current settings of sensor and information access control by various apps 14B. Based on the current settings of the sensor and information access control by various applications 14B, the use of the embodiments of this invention visualizes the user's privacy levels, which can be mapped, as in FIG. 8, to specific "user-understandable" privacy categories while abstracting the lower layers (e.g., sensors, file-systems) and the corresponding privacy threats, which are not necessarily fully understandable to the average user.

Figure 7:
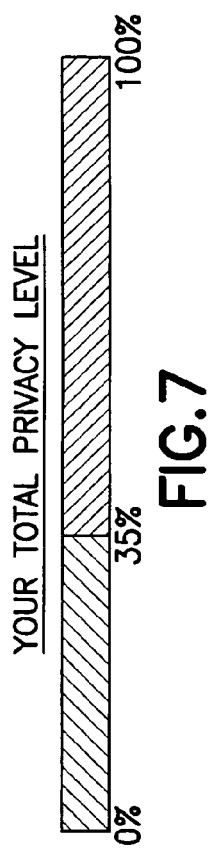
FIG. 7 shows one simple example of a privacy view where a user is informed with a bar type of display of the user's total privacy level.

FIG. 7 shows one simple example where the user is informed with a bar type of display of the user's total privacy level (e.g., on a scale of 0% to 100%, with 100% representing total privacy). That is, no applications can have access to any sensors of the device 10.

Figure 8:
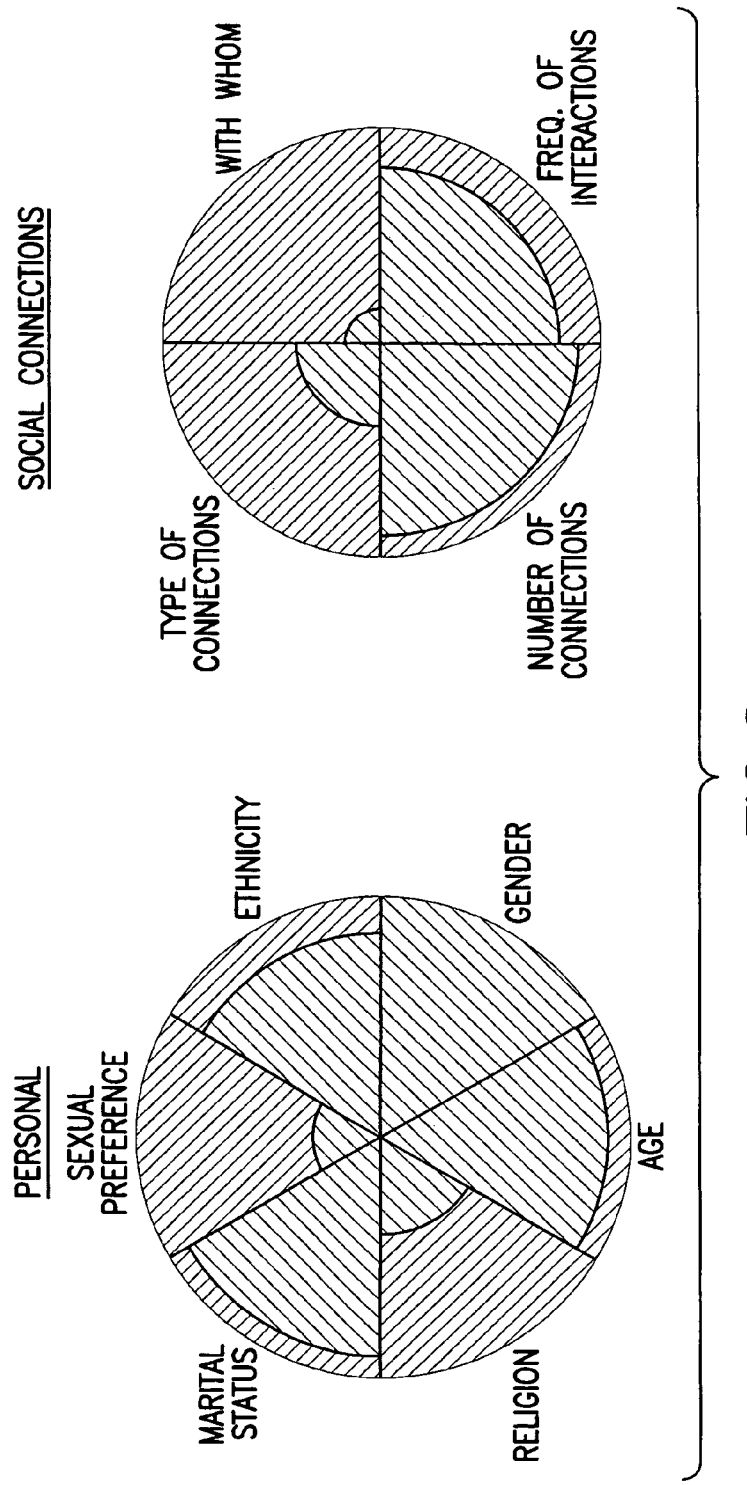
FIG. 8 shows an example of a more detailed privacy view having a pie chart type of depiction, where different privacy categories and sub-categories are depicted.

FIG. 8 shows an example of a more detailed privacy view, in this case having a pie chart type of depiction, where different privacy categories (e.g., as shown in FIG. 4) and sub-categories are depicted. This example shows the 'personal' privacy category and sub-categories (e.g., gender, age, etc.) and a 'social connections' category with sub-categories (e.g., type of connections, number of connections, etc.). In this example for the personal category the 'gender' sub-category has no privacy restrictions while the other sub-categories have relatively more privacy restrictions. This information is derived from the matrix representation of FIG. 4 and is visualized to the user in a readily understandable format.

Figure 9B:
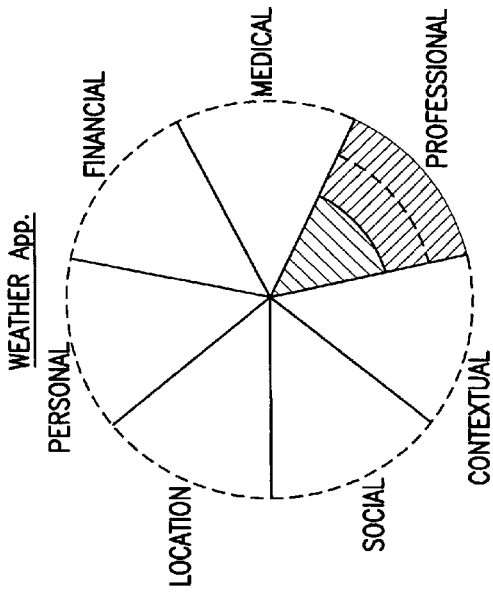
FIGS. 9A-9C, collectively referred to as FIG. 9, show examples of the visualization of user privacy levels on a per-application basis.
Figure 9C:
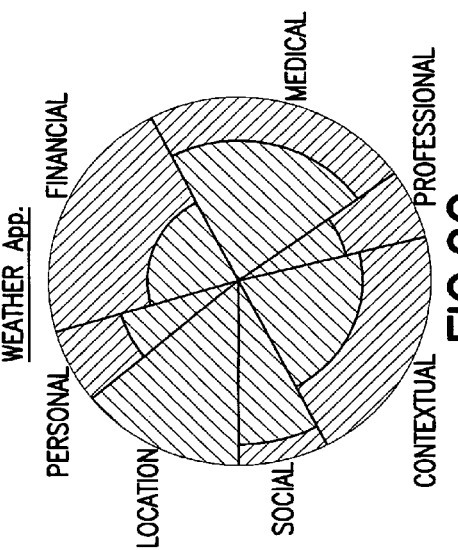
Figure 9A:
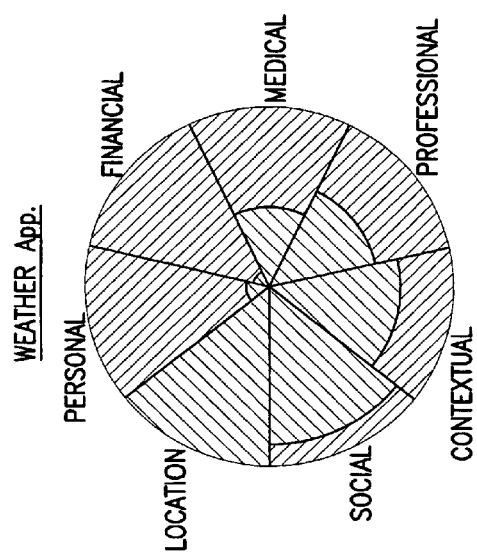

FIGS. 9A-9C, collectively referred to as FIG. 9, show examples of the visualization of user privacy levels per privacy category on a per-application basis (in this non-limiting case a weather application (app)). For example, FIG. 9A indicates to the user that for his location privacy category the weather application has unlimited sensor access, while the financial privacy category the weather application as almost no sensor access.

The visualization interface can be also used to input privacy-preferences by the user and to indicate limits that should not be exceeded as shown in FIG. 9B, and/or to differentiate between the importance of various components as in FIG. 9C (where the different privacy categories are given respective areas in the chart indicative of their relative importance).

It should be pointed out that while the visual information displayed to the user as in the examples of FIGS. 7, 8 and 9, as well as FIGS. 3A and 3B, is depicted herein in a grey scale fashion, in practice this information can be displayed using various colors selected from a system-defined and/or a user-defined color palette.

The exemplary aspects of this invention further enable updating the in-device privacy settings for protecting against new privacy intrusions. The exemplary embodiments provide the user with a friendly/understandable interface (embodied as the UI 14E) that aids the user in viewing and setting privacy settings, without the user necessarily understanding how sensor data can be used to infer personal information.

Figure 10:
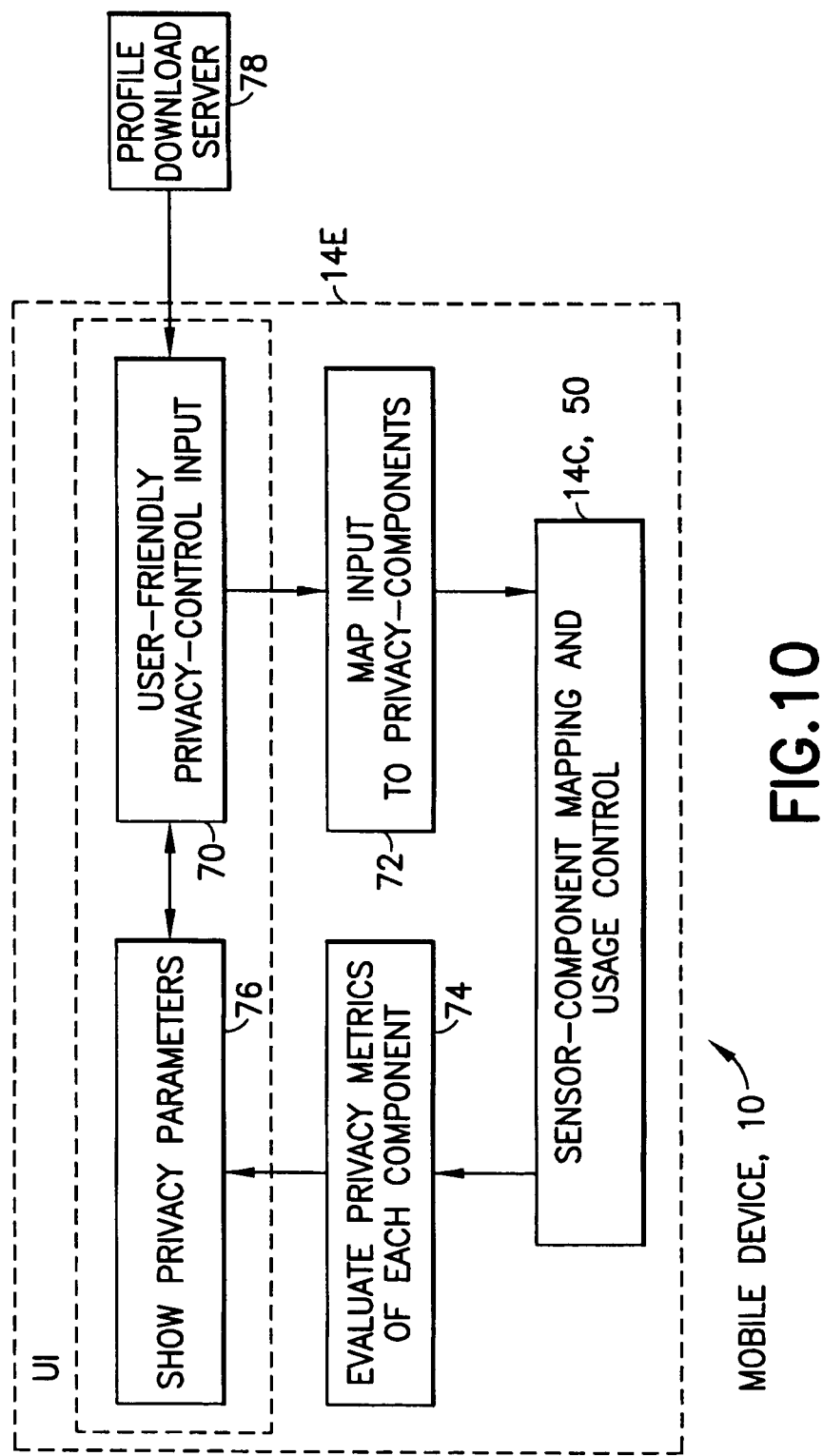
FIG. 10 is a block diagram showing a different view of the novel user interface of the device depicted in FIG. 1.

Referring to the view of the device 10 shown in FIG. 10, the block user-friendly privacy control input 70 and the block map input to privacy components 72 concern privacy settings, while the block evaluate privacy metrics for each component 74 and the block show privacy parameters 76 are used for visualizing the privacy metrics. As was previously mentioned, the visualization interface can be also used to set the privacy parameters. These blocks operate with the sensor component mapping and usage control functions 14C and 50 described above.

Discussed first is the user-friendly privacy control input 70. The user's profile can be either entered explicitly or as a result of a questionnaire that aids the user in defining the user's best-fit profile. In another embodiment the user preferences can be automatically inferred by the device 10 (e.g., based on the choices of the privacy settings that the user has made for other applications). The user's profile could also be downloaded from a profile download server 78.

The privacy categories (here exemplified as: Personal, Financial, Professional, Contextual, Medical, Social connections, Location) can be the outcome of user studies intended to find intuitive/friendly general privacy categories.

It is also possible to combine the "general" privacy profile setting with "occasional" privacy profile settings such as "hide my personal and social information whenever I am at work", where "personal" and "social" are privacy categories, and "I am at work" is a specific user context detected by the device 10 (e.g., such as based on data from the GPS subsystem 37, or based on detection of a "work"-related WLAN via the short range transceiver 31 as two non-limiting examples).

Figure 11:
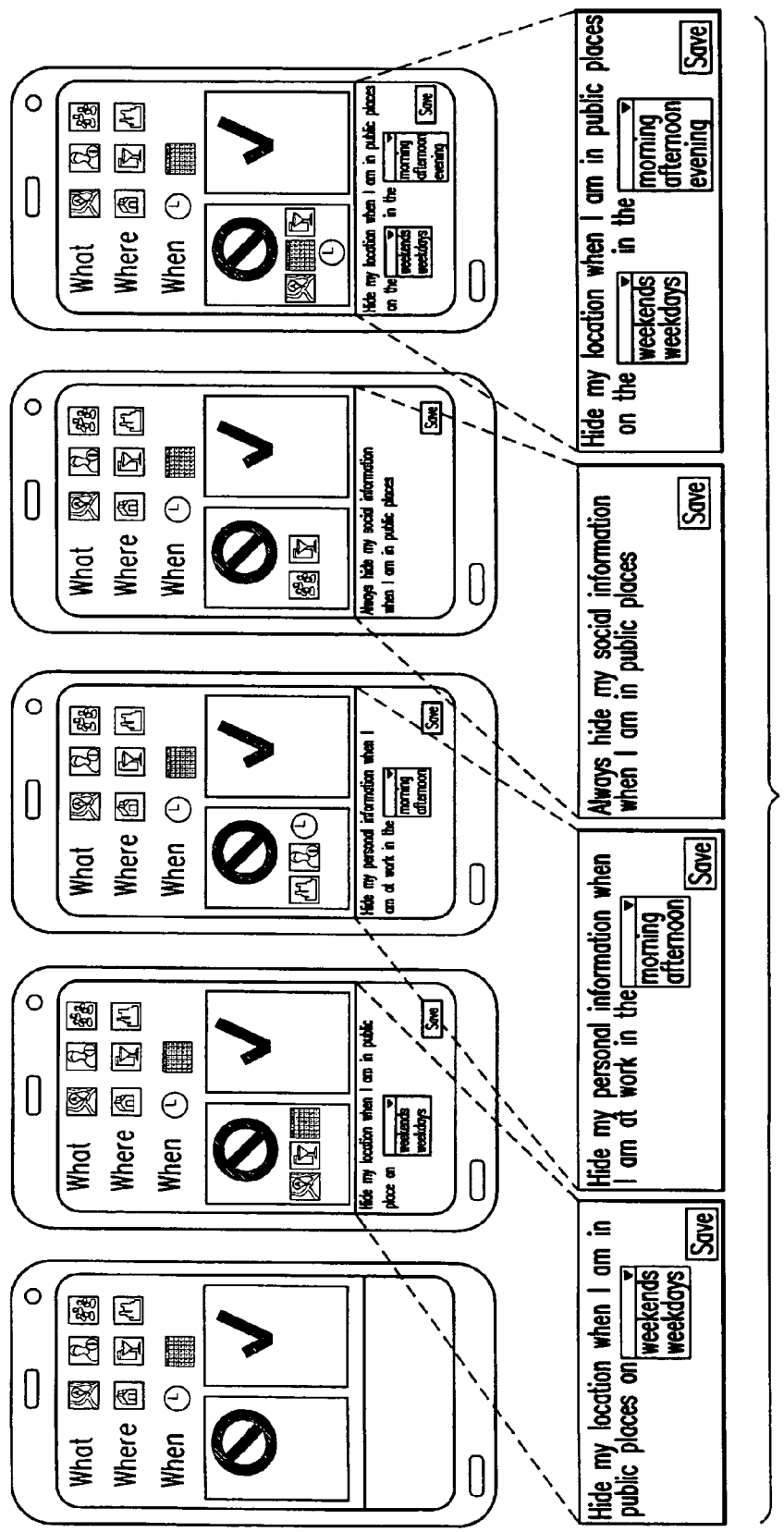
FIG. 11 shows examples of the operation of the user interface to set policies.

Note that such policies can be set using several methods, e.g., vocally (e.g., using the microphone 24 and voice recognition unit 24A), graphically (e.g. using the touch screen 16), etc. In one embodiment the user could drag and drop icons into a "forbidden bin" and the text for the policy is generated automatically, as shown in FIG. 11.

Discussed now is the map input to privacy components block 72 of FIG. 10. In order to facilitate the mapping between privacy categories and sensors, each privacy category is divided into the different components or sub-categories (e.g., Personal=Gender+Age+Religion, etc.). This privacy category decomposition aids in the mapping from the "user-friendly" privacy categories to the level of the sensors (blocks 70 and 72 of FIG. 10) as well as in quantifying the level of privacy provided the access to a given set of sensors (blocks 74 and 76 of FIG. 10).

In general those components are easier to quantify than the higher level categories. For example, if an application is provided with sensor information that aids the application in identifying that the user is either Christian or Muslim, then the confusion level is 2/15 (assuming that there are a total of 15 religions). The corresponding sensor information comprises GPS coordinates and time indicating that the user regularly visits an area where a church and a mosque can be found close to each other. Combining GPS data with other sensor data can help in fine-tuning the guess.

In the previous example of 'guessing' the religion of the user it can be seen that the GPS 37 information can be combined with other sensor data in order to reduce the level of ambiguity. For example, if the WLAN indicates a WiFi access point that is closer to the Mosque than to the Church, then the mobile user is more likely to be a Muslim.

Discussed now is the evaluate privacy metrics of each component block 74. In order to evaluate the privacy level so that it can be displayed to the user the device 10 can perform the role of an attacker by analyzing the data revealed thus far, using state-of-art algorithms (that are kept up-to-date) and abstracts from the details of which privacy metric to be used (e.g., entropy, k-anonymity, etc.) The metric (or "confusion level", or "ambiguity level") is computed for each privacy component (e.g., religion, gender, etc.) taking into consideration the entire space of each component (e.g., Christian, Muslim, Buddhist, Hindu, etc.). The privacy level (e.g., "confusion level") is then set to be displayed to the user.

Discussed now is the show privacy parameters block 76. The result of the previous metric computation can be displayed to the user. Various groupings (per category, per application, etc.) and averaging can be performed for usability conveniences (reference can again be made to FIGS. 8 and 9).

The user can use this interface to input his preferences, such as the bounds for specific component visibility (metric), or how important are specific components to the user (e.g. by enlarging the corresponding sector, therefore increasing the visibility as depicted in FIG. 9C).

In addition to the privacy-related messages/graphs, the privacy panel can include a window for messages from an application developer, e.g.:

"In order to obtain the weather forecast with the highest precision, please set your location visibility to 100%.

Your current setting is 35%, reducing the utility/precision of the forecast."

Thus, communication between developers of the apps 14B and the user based on the user's privacy profiles is made possible.

It should be noted again that references to accesses to "sensors" can be construed to mean accesses to all information sources on the device 10 such as the file system (e.g., contact list, logs, etc.), built in devices (e.g., camera, microphone, etc.) in addition to the various other sensors.

As should be appreciated, the use of these exemplary embodiments serves to abstract the technical details of which sensors/data are privacy sensitive, and abstract what privacy intrusion methods can be deployed, mapping them all to a human user-friendly language, for inputting privacy settings or for displaying the privacy-status to the user.

Note that it is within the scope of the exemplary embodiments of this invention to employ the user interface 14E to enable the user to define a user-related privacy category or sub-category, and to then map sensors for the user-defined category or sub-category. As a non-limiting example, if a user is a collector of rare books the user may wish to define a separate privacy category, e.g., 'Collecting interests', or a separate sub-category under (e.g.) the 'Personal' category, in order to specifically control those device sensors that are permitted (if any) to be accessed by application programs 14B when the user is involved in this activity.

The ability to enable the user to specify certain privacy categories is related at least in part to making the privacy tool more customizable for the user. Further in this regard, and by example, when a user adds a new privacy category or sub-category any relevant Contextual Algorithms 14D can be downloaded automatically from a server; the relevant sensors (input sources) determined and interception code installed automatically to monitor those sensors; making it possible to both detect violations and display privacy levels corresponding to the newly added privacy category or sub-category.

Based on the foregoing it should be apparent that the exemplary embodiments of this invention provide a method, apparatus and computer program(s) to enhance a user's control over the user's privacy. An important aspect of the exemplary embodiments of this invention is the user interface that can represent privacy levels of each application program to the user in a "user-friendly" format. Another important aspect of the exemplary embodiments is to provide the user device with an ability to detect and act on or at least report privacy violations by the application programs.

Figure 12:
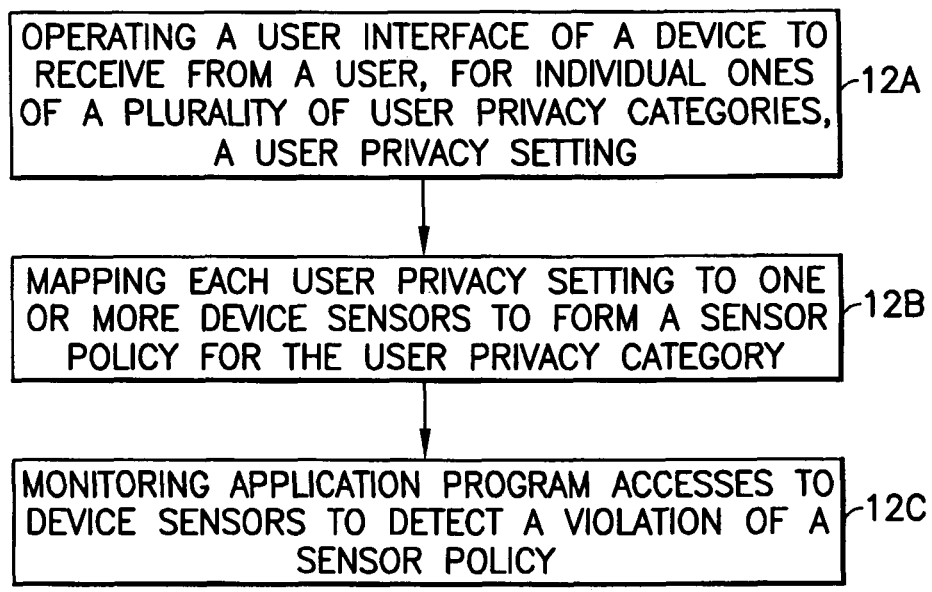
FIG. 12 is a logic flow diagram that illustrates the operation of a method, and a result of execution of computer program instructions, in accordance with the exemplary embodiments of this invention.

FIG. 12 is a logic flow diagram that illustrates the operation of a method, and a result of execution of computer program instructions, in accordance with the exemplary embodiments of this invention. In accordance with these exemplary embodiments a method performs, at Block 12A, a step of operating a user interface of a device to receive from a user, for individual ones of a plurality of user privacy categories, a user privacy setting. At Block 12B there is a step of mapping each user privacy setting to one or more device sensors to form a sensor policy for the user privacy category. At Block 12C there is a step of monitoring application program accesses to device sensors to detect a violation of a sensor policy.

The various blocks shown in FIG. 12 may be viewed as method steps, and/or as operations that result from operation of computer program code, and/or as a plurality of coupled logic circuit elements constructed to carry out the associated function(s).

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

It should thus be appreciated that at least some aspects of the exemplary embodiments of the inventions may be practiced in various components such as integrated circuit chips and modules, and that the exemplary embodiments of this invention may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary embodiments of this invention.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Further, the various names used for the described privacy categories (e.g., Personal, Professional, Context, Social Connections, etc.) and sub-categories thereof are not intended to be limiting in any respect, as these privacy categories and sub-categories may be identified by any suitable names. Further, the various names assigned to different sensors are not intended to be limiting in any respect, as these various sensors may be identified by any suitable names.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

What is claimed is:

1. A method, comprising:
    operating a user interface of a device to receive from a user, for individual ones of a plurality of user privacy categories, a user privacy setting;
    mapping each user privacy setting to one or more device sensors to form a sensor policy for the user privacy category; and
    monitoring application program accesses to device sensors to detect a violation of a sensor policy,
    where at least some user privacy categories are comprised of at least one sub-category, and where mapping forms a sensor policy for each of the at least one sub-category.

2. The method of claim 1, where monitoring comprises enforcing user privacy settings in real-time by blocking an access by an application program to a sensor that violates a sensor policy.

3. The method of claim 1, where monitoring comprises enforcing user privacy settings in non-real-time by recording an access by an application program to a sensor that violates a sensor policy, and reporting the access.

4. The method of claim 1, where monitoring is performed at an operating system level.

5. The method of claim 1, where monitoring is performed at a platform level.

6. The method of claim 1, where monitoring is performed the level of the application program.

7. The method of claim 1, where monitoring is performed a network level.

8. The method of claim 1, where monitoring further comprises:
    recording application program accesses to device sensors;
    based at least on the mapping, determining what user personal information could be inferred based on the recorded application program accesses; and
    reporting the determined inferred personal information to the user.

9. The method of claim 1, where operating the user interface further comprises presenting to the user a representation of a current overall privacy level of the user.

10. The method of claim 1, where operating the user interface further comprises presenting to the user a representation of a current privacy level of the user for individual ones of the at least one sub-category of a particular privacy category.

11. The method of claim 1, where operating the user interface further comprises presenting to the user a representation of a current privacy level of the user for individual ones of the privacy categories for a particular application program.

12. The method of claim 1, where operating the user interface further comprises presenting to the user a representation of a current privacy preference of the user for individual ones of the privacy categories to one or more of indicate limits that should not be exceeded and differentiate between a relative importance of the privacy categories to each other.

13. The method of claim 1, where operating the user interface further comprises presenting to the user a communication from a developer of an application program with information related to a suggested privacy setting for the application program.

14. The method of claim 1, where mapping to a device sensor maps to a single device sensor or to a combination of two or more device sensors.

15. The method of claim 1, where operating the user interface further comprises enabling the user to define a privacy category and at least one privacy sub-category, and mapping at least one device sensor to form a sensor policy for the user-defined privacy category or privacy sub-category.

16. A non-transitory computer-readable medium that contains software program instructions, where execution of the software program instructions by at least one data processor results in performance of operations that comprise execution of the method as claimed in claim 1.

17. An apparatus, comprising:
a processor; and
a memory including computer program code, where the memory and computer program code are configured to, with the processor, cause the apparatus at least to operate a user interface of the apparatus to receive from a user, for individual ones of a plurality of user privacy categories, a user privacy setting; to map each user privacy setting to one or more sensors of the apparatus to form a sensor policy for the user privacy category; and to monitor application program accesses to the sensors to detect a violation of a sensor policy,
where the memory and computer program code further are configured, with the processor, to record application program accesses to device sensors and based at least on the mapping, to determine what user personal information could be inferred based on the recorded application program accesses; and to report the determined inferred personal information to the user.

18. The apparatus of claim 17, where at least some user privacy categories are comprised of at least one privacy sub-category, and where the memory and computer program code further are configured, with the processor, to form a sensor policy for each of the sub-categories.

19. The apparatus of claim 17, where the memory and computer program code further are configured, with the processor, to enforce user privacy settings in real-time by blocking an access by an application program to a sensor that violates a sensor policy.

20. The apparatus of claim 17, where the memory and computer program code further are configured, with the processor, to enforce user privacy settings in non-real-time by recording an access by an application program to a sensor that violates a sensor policy and reporting the access.

21. The apparatus of claim 17, where the memory and computer program code further are configured, with the processor, to monitor application program access at one or more of an operating system level, a platform level, at an application program level and a network level.

22. The apparatus of claim 18, where the memory and computer program code further are configured, with the processor, to at least one of present to the user a representation of a current overall privacy level of the user, present to the user a representation of a current privacy level of the user for individual ones of sub-categories of a particular privacy category, present to the user a representation of a current privacy level of the user for individual ones of the privacy categories for a particular application program, present to the user a representation of a current privacy preference of the user for individual ones of the privacy categories to one or more of indicate limits that should not be exceeded and to differentiate between a relative importance of the privacy categories to each other, and present to the user a communication from a developer of an application program with information related to a suggested privacy setting for the application program.

23. The apparatus of claim 17, where the memory and computer program code further are configured, with the processor, to enable the user to define a privacy category or a privacy sub-category associated with a particular privacy category and to map at least one device sensor to form a sensor policy for the user-defined privacy category or privacy sub-category.

24. A non-transitory computer readable data storage medium that stores a data structure, the data structure comprising a matrix having columns each comprised of a user's personal information expressed as privacy categories and sub-categories, and rows each comprised of a sensor of a user device in which the non-transitory computer readable data storage medium is installed, said data structure further comprising indications recorded for particular privacy categories and sub-categories of the privacy categories whether a particular sensor has been selected by the user to apply to the privacy categories and sub-categories so as to indicate whether to permit or to inhibit an application program to have access to the output of the particular sensor.

25. The method of claim 1, further comprising visualizing for the user the user's current privacy settings based on current settings of sensor policies and information access control by one or more applications.

26. The apparatus of claim 17, where the memory and computer program code further are configured, with the processor, to visualize for the user the user's current privacy settings based on current settings of sensor policies and information access control by one or more applications.

* * * * *